United States Patent
Shao et al.

(10) Patent No.: US 7,925,269 B2
(45) Date of Patent: Apr. 12, 2011

(54) METHOD AND SYSTEM FOR ESTABLISHING A CHANNEL FOR A WIRELESS VIDEO AREA NETWORK

(75) Inventors: Huai-Rong Shao, San Jose, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 893 days.

(21) Appl. No.: 11/801,611

(22) Filed: May 10, 2007

(65) Prior Publication Data

US 2007/0270121 A1 Nov. 22, 2007

Related U.S. Application Data

(60) Provisional application No. 60/801,767, filed on May 18, 2006.

(51) Int. Cl.
*H04W 72/08* (2009.01)
(52) U.S. Cl. .......................... 455/450; 370/329
(58) Field of Classification Search .............. 455/422.1, 455/445, 446, 449, 450, 452.1, 452.2; 370/315, 370/329, 330, 336, 337
See application file for complete search history.

(56) References Cited

U.S. PATENT DOCUMENTS

| 2004/0111476 A1* | 6/2004 | Trossen et al. | 709/206 |
| 2004/0229566 A1* | 11/2004 | Wang et al. | 455/63.1 |
| 2007/0072638 A1* | 3/2007 | Yang et al. | 455/522 |
| 2007/0155330 A1* | 7/2007 | Pendergrass et al. | 455/63.1 |
| 2008/0069029 A1* | 3/2008 | Chow | 370/328 |

FOREIGN PATENT DOCUMENTS

| EP | 1427150 A2 | 6/2004 |
| WO | WO2006/050136 A2 | 5/2006 |

OTHER PUBLICATIONS

Hitachi, Ltd. et al., High-Definition Multimedia Interface (HDMI) Specification Version 1.2, Aug. 22, 2005, pp. 1-214.
802.15.3 ™ IEEE Standard for Information Technology-Telecommunications and information exchange between systems-Local and metropolitan area networks-Specific requirements, Part 15.3: Wireless Medium Access Control (MAC) and Physical Layer (PHY) Specifications for High Rate Wireless Personal Area Networks (WPANs), IEEE Std 802.15.3-2003, IEEE Computer Society, Sep. 29, 2003, 324 pages.
Van Veen, B.; and Buckley, K., "Beamforming: A Versatile Approach to Spatial Filtering," IEEE ASSP Magazine, vol. 5, pp. 4-24, Apr. 1988.
Patent Cooperation Treaty; International Search Report and written opinion for PCT/KR2007/002401. Aug. 28, 2007.

* cited by examiner

*Primary Examiner* — Blane J Jackson
(74) *Attorney, Agent, or Firm* — Kenneth L. Sherman, Esq.; Michael Zarrabian, Esq.; Myers Andras Sherman & Zarrabian LLP

(57) ABSTRACT

A method and system for establishing a channel in a wireless video area network, is provided. Establishing a channel involves scanning available high-rate and low-rate channels, selecting a channel from the available channels with minimal interference with other networks, determining if the selected channel remains available for a listening period, and if the selected channel remains available, then starting communication on the selected channel. The selected channel is a high-rate channel and a corresponding low-rate channel.

33 Claims, 8 Drawing Sheets

50

60

60

METHOD AND SYSTEM FOR ESTABLISHING A CHANNEL FOR A WIRELESS VIDEO AREA NETWORK

RELATED APPLICATION

This application claims priority from U.S. Provisional Patent Application Ser. No. 60/801,767, filed on May 18, 2006, incorporated herein by reference.

FIELD OF THE INVENTION

The present invention relates to channel control, and in particular to channel control in a Wireless Video Area Network (WVAN).

BACKGROUND OF THE INVENTION

With the proliferation of high quality video, an increasing number of electronics devices (e.g., consumer electronic devices) utilize high-definition (HD) video which can require multiple gigabits per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some video information can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals.

The OSI standard provides a seven-layered hierarchy between an end user and a physical device through which different systems can communicate. Each layer is responsible for different tasks, and the OSI standard specifies the interaction between layers, as well as between devices complying with the standard. The OSI standard includes a physical layer, a data link layer, a network layer, a transport layer, a session layer, a presentation layer and an application layer. The IEEE 802 standard provides a three-layered architecture for local networks that approximate the physical layer, and the data link layer of the OSI standard. The three-layered architecture in the IEEE 802 standard 200 includes a physical (PHY) layer, a Media Access Control (MAC) layer and a logical link control (LLC) layer. The PHY layer operates as that in the OSI standard. The MAC and LLC layers share the functions of the data link layer in the OSI standard. The LLC layer places data into frames that can be communicated at the PHY layer, and the MAC layer manages communication over the data link, sending data frames and receiving acknowledgement (ACK) frames. Together the MAC and LLC layers are responsible for error checking as well as retransmission of frames that are not received and acknowledged.

Wireless local area networks (WLANs) as defined by the IEEE 802 standard and similar technologies can suffer interference issues when several devices are connected which do not have the bandwidth to carry the uncompressed HD signal, and do not provide an air interface with enough bandwidth to transmit uncompressed video over 60 GHz band. The IEEE 802.15.3 specifies channel access methods for transmission of audio/visual information over Wireless personal area networks (WPANs). However, in IEEE 802.15.3, channel access control is complicated and is only for access to a single channel. In addition, in IEEE 802.15.3, channel time allocation description carried in a beacon is limited to one channel time block in a superframe for one compressed A/V stream. However, for an uncompressed video stream, multiple channel time blocks in one superframe are needed to fulfill the delay and buffer requirements. There is, therefore, a need for a method and system for establishing a channel and channel control in wireless communication networks which address the above shortcomings.

BRIEF SUMMARY OF THE INVENTION

The present invention provides a method and system for establishing a channel in a wireless video area network. In one embodiment, establishing a channel includes scanning available channels, selecting a channel from the available channels with minimal interference with other networks, determining if the selected channel remains available for a listening period, and if the selected channel remains available, then starting communication on the selected channel.

The available channels include high-rate (HR) frequency channels and low-rate (LR) frequency channels, such that m HR channels in a general frequency band are defined by a High-Rate PHY (HRP) as HRP channels, and n LR channels are defined by a Low-Rate PHY (HRP) as LRP channels in the same frequency band as the HRP, such that within each of the HRP channels, a number n of LRP channels are defined.

Scanning available channels includes first scanning the LRP channels by performing energy detection for each LRP channel for a time period, to determine a LRP peak energy detection value for each LRP channel. Scanning available channels further includes selectively scanning those HRP channels within which all the LRP channels have LRP peak energy detection values smaller than a specified LRP interference threshold.

Further, each HRP channel has a start frequency and a stop frequency which define a HRP frequency band for the HRP channel, and each LRP channel has a start frequency and a stop frequency which define a LRP frequency band within the corresponding HRP frequency band. Selectively scanning the HRP channels further includes, for each HRP channel to be scanned, performing energy detection in frequency increments corresponding to the LRP frequency bands within the HRP channel, to determine a HRP peak energy detection value for the HRP channel. Selecting a channel from the available channels further includes choosing a HRP channel having a minimum HRP peak energy detection value among all the scanned HRP channels. The minimum HRP peak energy detection value is smaller than a HRP interference threshold. Selecting a channel from the available channels further includes selecting a LRP channel with a minimal LRP peak energy detection value among the LRP channels within the chosen HRP channel.

Then, a HR channel is established, and access to the HR channel and the selected channel is controlled by dividing the channel time into superframes separated by beacons, each superframe including channel time blocks (CTBs) having one or more reserved CTBs and one or more unreserved CTBs, and communicating packets over the channel during the reserved CTBs.

These and other features, aspects and advantages of the present invention will become understood with reference to the following description, appended claims and accompanying figures.

DETAILED DESCRIPTION OF THE INVENTION

The present invention provides a method and system for establishing a channel in a wireless video area network. In one embodiment, establishing a channel includes scanning available channels, selecting a channel from the available channels with minimal interference with other networks, determining if the selected channel remains available for a listening period, and if the selected channel remains available, then starting communication on the selected channel. The selected channel is a low-rate channel. Then, a HR channel is established, and access to the HR channel and the selected channel is controlled by dividing the channel time into superframes separated by beacons, each superframe including CTBs having one or more reserved CTBs and one or more unreserved CTBs, and communicating packets over the channel during the reserved CTBs.

Figure 1:
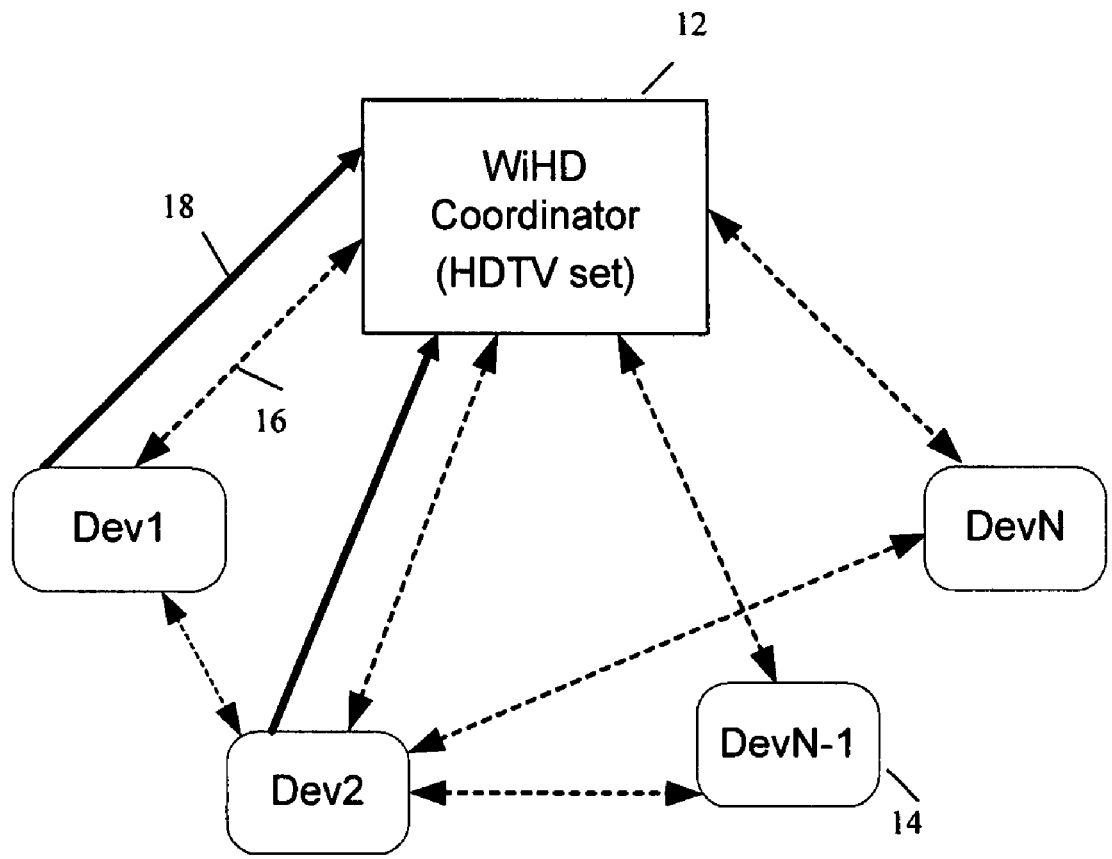
FIG. 1 shows a functional block diagram of a wireless network that implements uncompressed HD video transmission between wireless stations, according to an embodiment of the present invention.

FIG. 1 shows a functional block diagram of an example wireless network 10 for communication of uncompressed high-definition (HD) video between wireless stations, according to an embodiment of the present invention. The network 10 is based on the WirelessHD standard which is an industry-led effort to define a wireless digital network interface specification for wireless HD digital signal transmission on the 60 GHz frequency band, e.g., for consumer electronics products. The network 10 includes a coordinator 12 such as a wireless HD (WiHD) coordinator, and multiple wireless stations 14 (e.g., Dev1, . . . , DevN). The coordinator 12 and the stations 14 utilize a low-rate (LR) channel 16 (shown by dashed lines in FIG. 1) and a high-rate (HR) channel 18 (shown by heavy solid lines in FIG. 1) for communication therebetween.

In this embodiment, the coordinator 12 is a sink of video and/or audio data implemented, for example, in a HDTV set in a home wireless network environment which is a type of WPAN. Each station 14 comprises a device that can be the source of uncompressed video or audio. Examples of each station 14 can be a set-top box, a DVD player, etc. A station 14 can also be an audio sink. In another example, the coordinator 12 can be a source of a video stream. In yet another example, the coordinator provides channel coordination functions for wireless communication between a sink station and a source station. The coordinator functions such as channel access functions, according to the present invention can also be implemented in a stand-alone device, in a sink device and/or in a source device. A device can be a source of uncompressed video or audio like a set-top box or a DVD player. A device can also be an audio sink.

The coordinator 12 uses a LR channel 16 and a HR channel 18, for communication with the stations 14. Each station 14 uses the LR channel 16 for communications with other stations 14. The HR channel 18 only supports single direction unicast transmission with e.g., multi-Gb/s bandwidth to support uncompressed HD video transmission. The LR channel 16 can support bi-directional transmission e.g., with at most 40 megabits per second (Mbps) throughput. The LR channel 16 is mainly used to transmit control frames such as ACK frames. Some low-rate data such as audio and compressed video can be transmitted on the LR channel between two stations 14 directly.

The HR channel only supports single direction unicast transmission with multi-Gb/s bandwidth to support uncompressed HD video. The LR channel can support bi-directional transmission with at most 40 Mbps throughput. A low-rate channel is mainly used to transmit control frames such as ACK frames. It is also possible some low-rate data like audio and compressed video can be transmitted on the low-rate channel between two devices directly.

Figure 2:
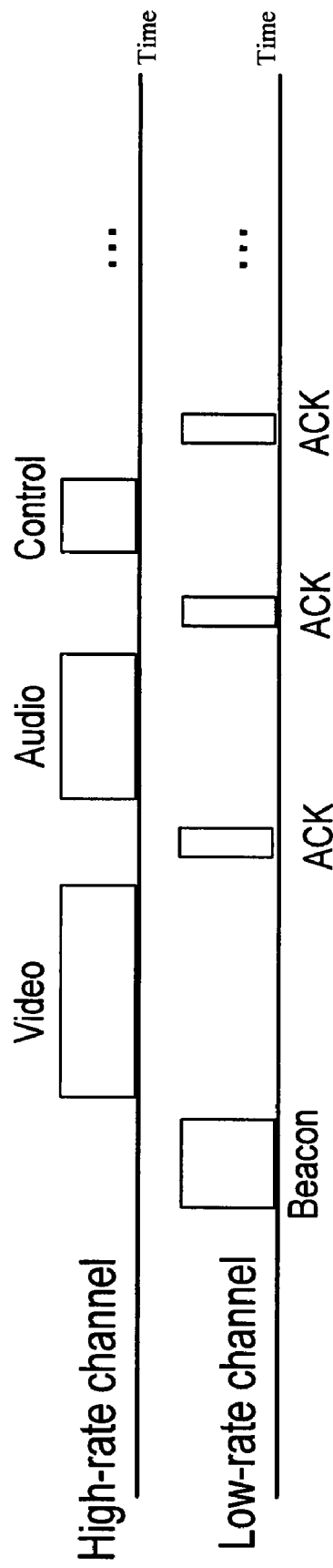
FIG. 2 shows an example timing diagram for a Time Division Duplex (TDD) scheduling applied to low-rate and high-rate wireless communication channels in FIG. 1.

As shown by the example timing diagram in FIG. 2, TDD scheduling is applied to the LR and HR channels 16 and 18, whereby at any one time the LR and HR channels 16 and 18, cannot be used in parallel for transmission. In the example of FIG. 2, beacon and ACK packets/frames are transmitted over the LR channel 16 in between transmission of packets of data (e.g., video, audio and control message) information over the HR channel 18. Beamforming technology can be used in both the LR and HR channels. The LR channel can also support omni-direction transmissions. The HR channel and the LR channel are logical channels.

In many wireless communication systems, a frame structure is used for data transmission between wireless stations such as a transmitter and a receiver. For example, the IEEE 802.11 standard uses frame structure in a MAC layer and a PHY layer. In a typical transmitter, a MAC layer receives a MAC Service Data Unit (MSDU) and attaches a MAC header thereto, in order to construct a MAC Protocol Data Unit (MPDU). The MAC header includes information such a source addresses (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

There are two approaches for a wireless station (STA) to access a shared wireless communication channel. One approach is a contention-free arbitration (CF) method, and the other is a contention-based arbitration (CB) method. There are multiple channel access methods for CF period. For example, a point coordinator function (PCF) can be utilized to control access to the channel. When a PCF is established, the PCF polls the registered STAs for communications and provides channel access to the STAs based on the polling results. The CB access method utilizes a random back-off period to provide fairness in accessing the channel. In the CB period, a STA monitors the channel, and if the channel has been silent for a pre-defined period of time, the STA waits a certain period of time, such that if the channel remains silent, the STA transmits on the channel.

The coordinator and the non-coordinator devices share the same bandwidth, wherein the coordinator coordinates the sharing of that bandwidth. Standards have been developed to establish protocols for sharing bandwidth in a wireless personal area network (WPAN) setting. As noted, the IEEE standard 802.15.3 provides a specification for the PHY layer and the MAC layer in such a setting where bandwidth is shared using a form of time division multiple access (TDMA). According to the present invention, the MAC layer defines a superframe structure, described below, through which the sharing of the bandwidth by the non-coordinator devices 14 is managed by the coordinator 12 and/or the non-coordinator devices 14.

Figure 3A:
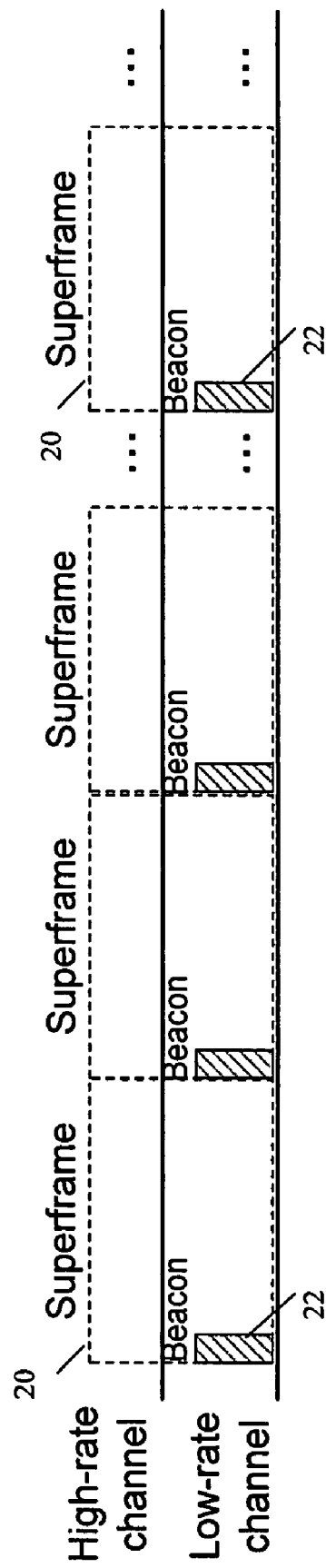
FIG. 3A shows an example superframe structure according to the present invention.
Figure 3B:
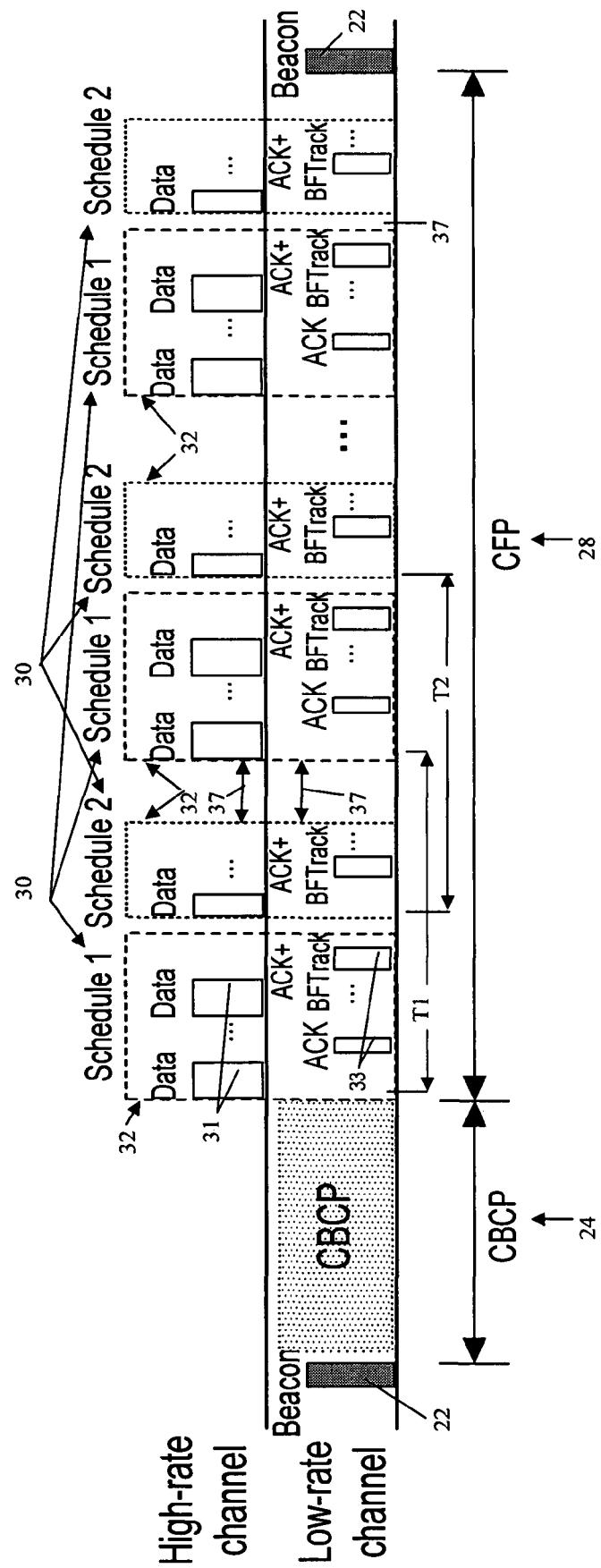
FIG. 3B shows example details of a superframe structure, according to the present invention.

According to the present invention, in a contention-free period, instead of the PCF polls, time scheduling is utilized wherein beacons provide information about scheduled channel time blocks. A superframe-based channel access control for transmission of uncompressed video over wireless channels, according to the present invention, is applied based on a superframe structure shown by example in FIGS. 3A-B. FIG. 3A shows a sequence of superframes 20, and FIG. 3B shows the details of a superframe 20 for the LR and HR channels including multiple schedules 30. Each schedule 30 includes one or more periodical reserved CTBs 32 which are reserved for transmission of isochronous data streams. In FIG. 3b, T1 indicates an interval between two consecutive CTBs which belong to Schedule 1, and T2 indicates the interval between two consecutive CTBs which belong to Schedule 2.

The schedules 30 represent the reserved CTBs 32, and the time periods between the schedules 30 are unreserved CTBs. As such, each superframe 20 includes two CTB categories: reserved CTBs 32, and unreserved CTBs. Such a superframe 20 is useful for channel access control using the CTBs for transmission of uncompressed video over wireless channels (e.g., the HR channel 18 and the LR channel 16). Beacons are used to separate channel time into multiple superframes. In each superframe there are contention periods and contention-free periods. In each CFP there are one or more schedules. A superframe includes a contention-based control period (CBCP), a CFP including multiple reserved channel time blocks (RCTBs) and/or unreserved channel time blocks (UCTBs). Specifically, the superframe 20 includes:

1. A beacon frame ("beacon") 22 which is used to set timing allocations and to communicate management information for the network 10 (e.g., WiHD sub-net). It is assumed that beacon signals are always transmitted omni-directionally.
2. A CBCP 24 used to communicate Consumer Electronic Commands (CECs) and MAC control and management commands on the LR channel 16. No information can be transmitted on the HR channel 18 within the CBCP period. There can also be a beam-search period (BSP) between the CBCP 24 and the CFP 28 to search transmission beams and adjust beamforming parameters (e.g., every 1~2 seconds a BSP can appear in the corresponding superframe 20).
3. The CFP 28 which includes said CTBs comprising one or more reserved CTBs 32 and one or more unreserved CTBs 37.

The reserved CTBs 32 are reserved by one or multiple stations 14 for transmission of commands, isochronous streams and asynchronous data connections. The reserved CTBs 32 are used to transmit commands, isochronous streams and asynchronous data connections. Each reserved CTB 32 can be used for transmitting a single data frame or multiple data frames. The schedules 30 organize the reserved CTBs 32. In each superframe 20, a schedule 30 can have one reserved CTB 32 (e.g., for pre-scheduled beam-searching or bandwidth reservation signaling) or multiple periodical reserved CTBs 32 (e.g., for an isochronous stream). Unreserved CTBs 37 are typically used to transmit CEC and MAC control and management commands on the LR channel. No beamforming transmission is allowed within the unreserved CTBs. Unreserved CTBs 37 can also be used for transmission of control and management packets between devices 14 if direct link support (DLS) is allowed. During an unreserved CTB 37, only the LR channel, operating in an omni-direction mode, can be utilized. No information can be transmitted on the HR channel during an unreserved CTB 37. Different contention-based medium access mechanisms, such as a carrier sense multiple access (CSMA) scheme or a slotted Aloha scheme can be used during an unreserved CTB 37.

A beacon 22 is transmitted periodically to identify the start of every superframe 20. Configuration of the superframe 20 and other parameters are included in the beacon 22. For example, the beacon 22 indicates the start time and length of the periods CBCP 24 and the CFP 28. In addition, the beacon 22 dictates an allocation of the CTBs in the CFP 28 to different stations 14 and streams. Since devices can implicitly know the timing information of unreserved CTBs, a beacon frame need not carry timing information for unreserved CTBs.

For reservation-based time allocation, data transmissions using beamforming must be reserved in advance. A device 14 requests send-bandwidth from the coordinator 12 for the transmission of both isochronous streams and asynchronous data. If there is enough bandwidth, the coordinator 12 allocates a schedule for the requesting device. Each schedule includes a series of evenly distributed reserved CTBs 32 having equal durations. A schedule can include multiple reserved CTBs 32, or one reserved CTB 32 in a superframe 20, or one reserved CTB 32 in every N superframes 20. Usually an isochronous stream is transmitted within one schedule for each superframe 20. However, it is also possible to allocate multiple schedules for one isochronous or asynchronous stream. Multiple streams belonging to the same device can also be transmitted within one schedule. Each data packet 31 transmitted from a device to a destination has a corresponding ACK packet 33 sent back from that destination, wherein each data packet 31 and corresponding ACK packet 33 form a data-ACK pair. A CTB 32 can include a single data-ACK pair or multiple data-ACK pairs.

A schedule can be reserved for periodical beam-searching in which one reserved CTB 32 appears every 1~2 seconds. Periodical beam-searching can also be performed within unreserved CTBs. In addition to periodical beam-searching, event-driven beam-searching (i.e., dynamic beam-searching) can be triggered by factors such as bad channel status. If event-driven beam-searching is to be implemented without affecting other reserved schedules, the length of any reserved CTB for a schedule ($T_{reserved\_CTB}$) plus the length of unreserved CTBs immediately after the reserved CTB ($T_{un\_reserved\_CTB}$) should not be less than the length of a beam-searching period $T_{beam-searching}$ (e.g., 400 µs as default). As such, $T_{reserved\_CTB} + T_{un\_reserved\_CTB} \geq T_{beam-searching}$.

In order to establish a WVAN for communication using the above superframe architecture, the coordinator 12 first establishes a channel. This involves scanning available frequencies to determine available channels (i.e., not in use by neighboring networks). All the LR channels are scanned to find channels with minimal interference with other networks. Then, the frequency band of the HR channels is scanned for interference, and a channel which minimal interference is selected.

A total of m channels in the frequency range of 57-66 GHz are defined by a High Rate PHY (HRP) for the HR frequency. Due to regulatory restrictions, not all of these channels are available in all geographic regions. For example, when m=4, four channels are indexed by a HRP Channel index. These HRP frequency channels are defined in Table 1 below.

TABLE 1

HRP Frequency Channels

| HRP Channel index | Start frequency (GHz) | Center frequency (GHz) | Stop frequency (GHz) |
|---|---|---|---|
| 1 | 57.2 | 58.2 | 59.2 |
| 2 | 59.4 | 60.4 | 61.4 |
| 3 | 61.6 | 62.6 | 63.6 |
| 4 | 63.8 | 64.8 | 65.8 |

Each HRP channel has a start frequency and a stop frequency (with a center frequency), which define a HRP frequency band.

A Low Rate PHY (LRP) for the LR frequency uses the same frequency bands as the HRP, wherein within each of the HRP channels, a number n of LRP channels are defined. In this example, for n=3, three LR channels are defined for each of the four HRP channels. Only one LRP channel is used by a WVAN at a time. This allows multiple WVANs to use the same HRP frequency channel in close proximity, while minimizing channel interference. Each LRP channel is defined relative to the center frequency of the corresponding HRP channel, fc(HRP). As such, within each of the HRP channels, three LRP channels are defined near the center frequency of the HRP channel. The LRP frequency channels, indexed by a LRP Channel index, are defined in Table 2 below.

TABLE 2

LRP Frequency Channels

| LRP Channel index | Start frequency (GHz) | Center frequency (GHz) | Stop frequency (GHz) |
|---|---|---|---|
| 1 | fc(HRP) − 240 MHz | fc(HRP) − 200 MHz | fc(HRP) − 160 MHz |
| 2 | fc(HRP) − 40 MHz | fc(HRP) | fc(HRP) + 40 MHz |
| 3 | fc(HRP) + 160 MHz | fc(HRP) + 200 MHz | fc(HRP) + 240 MHz |

Each LRP channel has a start frequency and a stop frequency (with a center frequency), which define a LRP frequency band. In this example, each LRP frequency band is a 80 MHz band, the LRP channels are separated by 120 MHz bands, and the center frequencies of the LRP channels are separated by 200 MHz.

Figure 4:
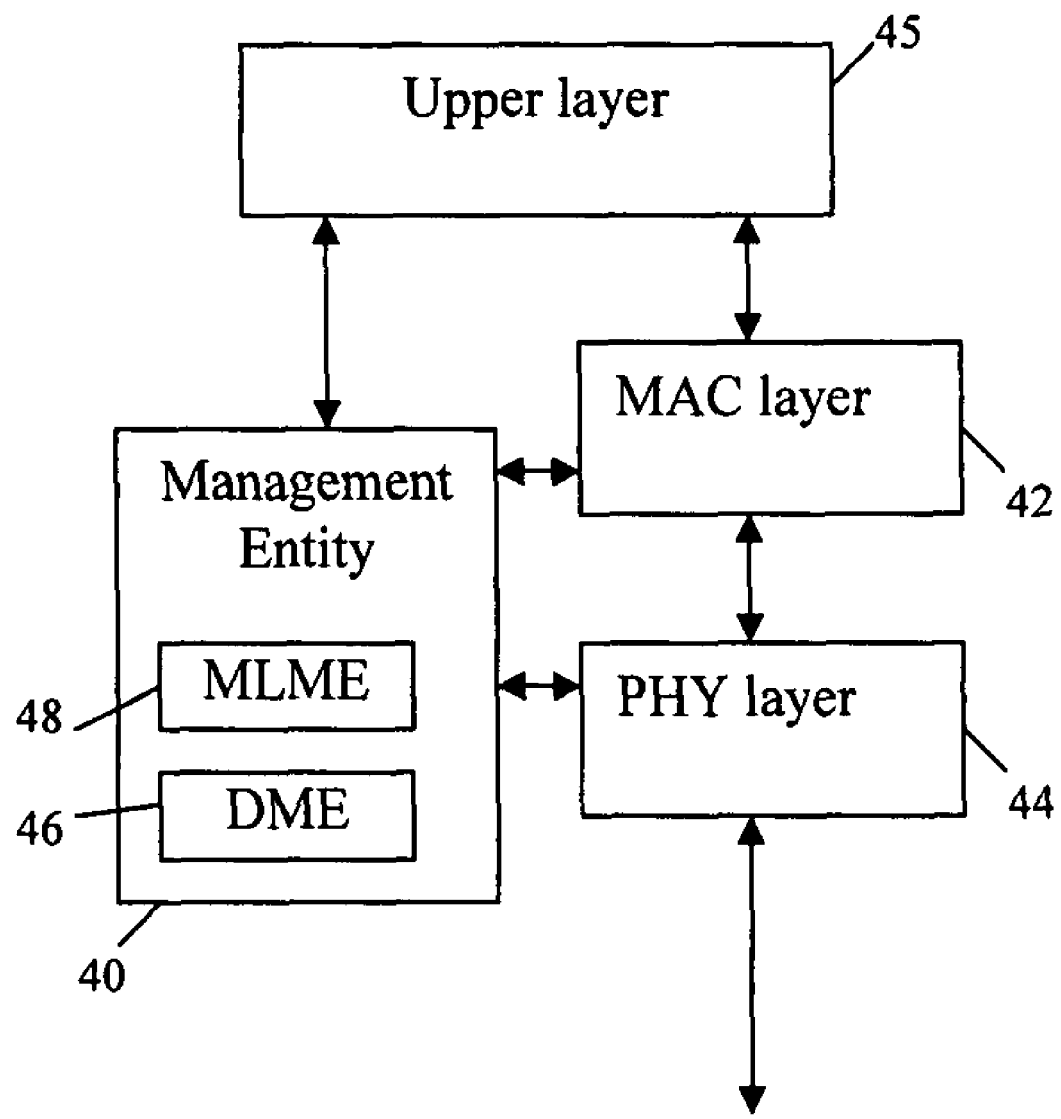
FIG. 4 shows an example management entity for selecting a channel for starting a WVAN.

Scanning of available frequencies to determine available channels is facilitated using a scanning function. Then a channel selected among the available channels by a channel selection function. FIG. 4 shows an example management entity 40, including a MAC layer management entity (MLME) function 48 for selecting available channels, scanning channels, and managing MAC layer operations such as controlling the operation of the coordinator in establishing a channel, and a device management entity (DME) function 46 for conducting energy detection on a channel selected to be scanned. Energy detection includes measuring the signal energy on the channel, and choosing the maximum value measured. The coordinator 12, and each of the devices 14, include a management entity 40 (i.e., the coordinator includes both a DME and a MLME, and each device includes both a DME and a MLME). The management entity 40 further provides monitoring and control functions to a MAC layer 42 and a PHY layer 44, and facilitates communication between the upper layers 45 and the MAC layer 42, according to the present invention. The MLME messages below are defined by the IEEE 802.15.3 standard ("Wireless Medium Access Control (MAC) and Physical Layer (PHY) Specifications for High Rate Wireless Personal Areas Networks (WPANs)," 2003), incorporated herein by reference. The operations of the DME and MLME functions in response to the MLME messages are according to the present invention.

Figure 5:
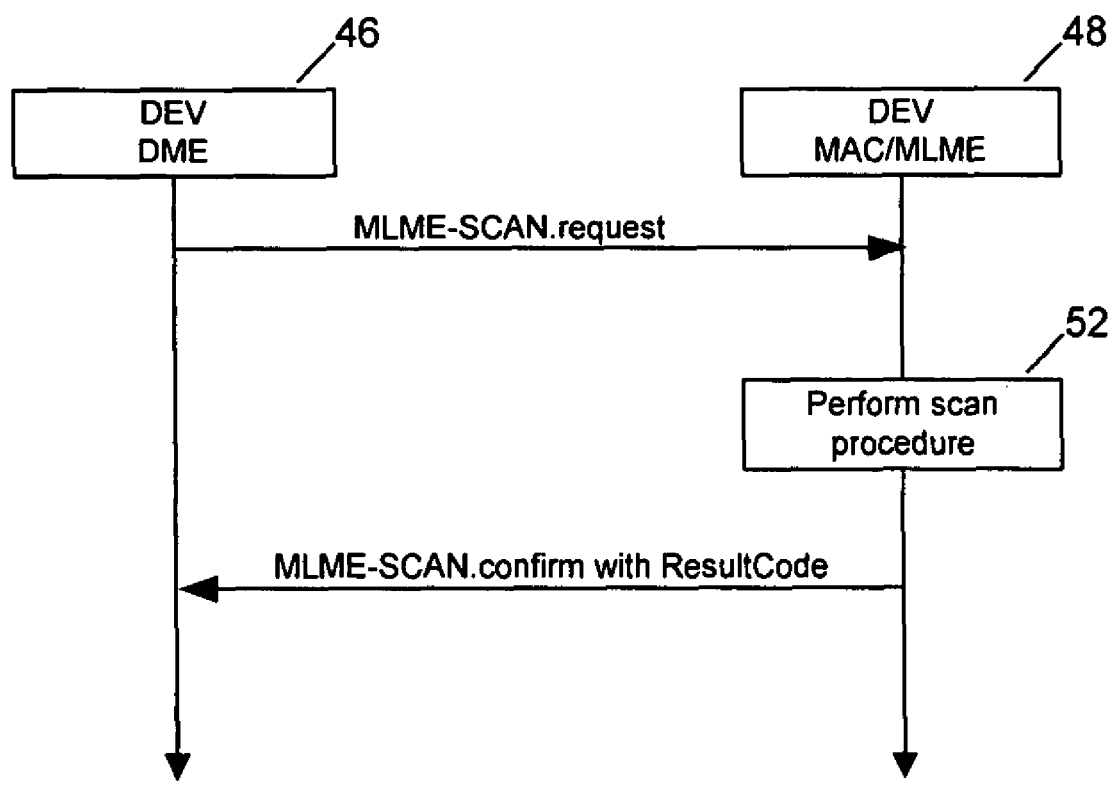
FIG. 5 shows an example of a message flow and scan operation, according to the present invention.

To establish a WVAN, a DME function 46 first issues a MLME-SCAN.request message to a MLME function 48 for scanning a specified set of HRP and corresponding LRP channels. FIG. 5 shows an example of message flow and scan operation 50, according to the present invention. The MLME function 48 performs a scan procedure 52, and returns a MLME-SCAN.confirm message including channel rating information (i.e., ChannelRatingList), with a ResultCode. Using the channel rating information, the DME function 46 selects a channel among the HRP and LRP channels with the least amount of interference to start the WVAN. Specifically, the DME function 46 attempts to select a channel with minimal interference among all the HRP and LRP channels, wherein that interference is smaller than specified thresholds (e.g., −50 dB). Then, the DME function 46 starts a new WVAN operation on that selected channel, as described in more detail further below.

Figure 6:
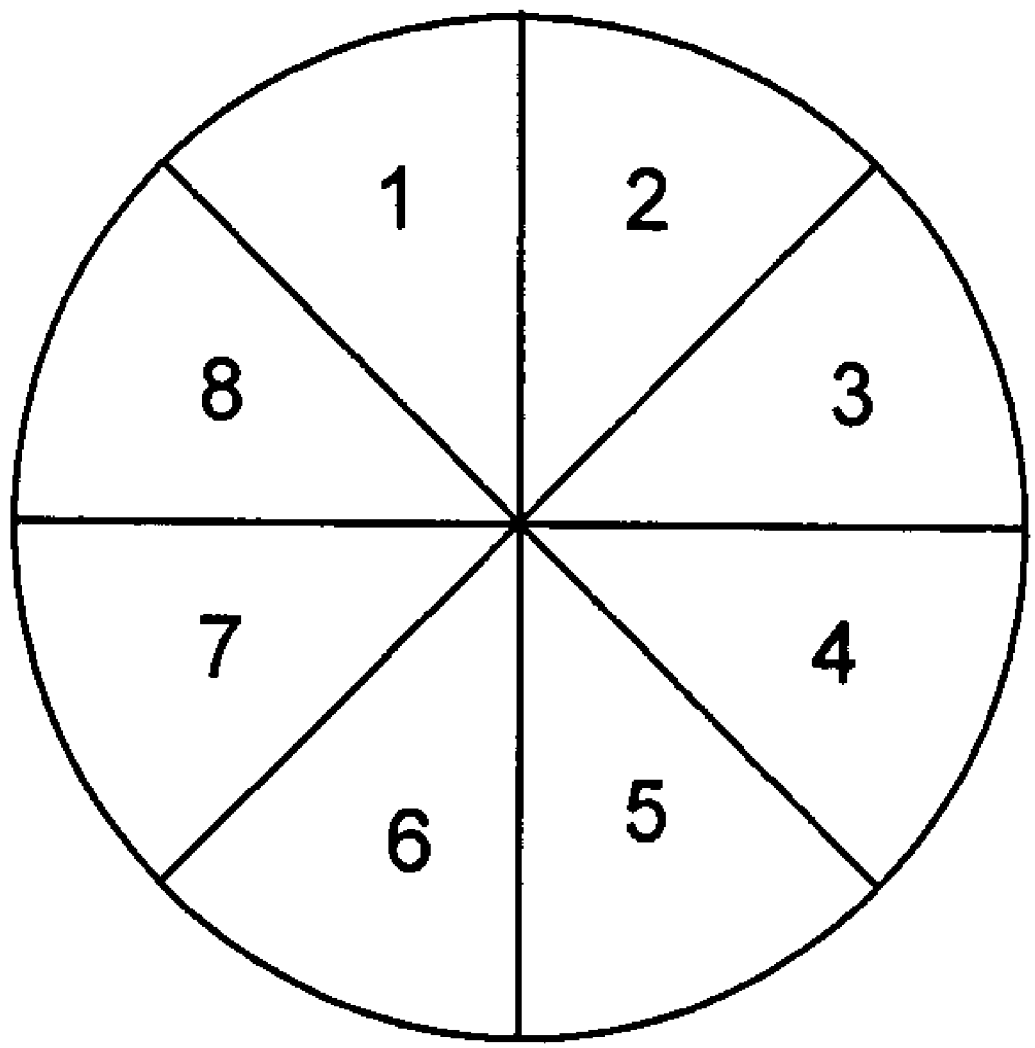
FIG. 6 shows an example of energy detection in different directions for channel scan, according to the present invention.

There are two channel scanning passes in the channel scanning procedure 52 performed by the MLME function 48, as follows:

1. Scan all the LRP channels first. For each LRP channel, the MLME function first switches to omni-directional mode, and then repeatedly performs a radio frequency energy detection measurement for a period longer than a superframe duration. A maximum energy detection value measurement obtained during this period is noted as a LRP peak energy detection value before moving on to the next LRP channel. As shown by an example process 60 in FIG. 6, energy detection is performed in different directions (e.g., directions 1, 2, . . . , 8, each covering a 45 degree angle) to emulate omni-directional energy detection.

2. Selectively scan only those HRP channels within which all three corresponding LRP channels have smaller LRP peak energy detection values than a specified LRP interference threshold. The MLME function utilizes LRP-emulated channel scanning for scanning a HRP channel. This is achieved as follows. From the start frequency of a HRP channel, the MLME function repeatedly performs radio frequency energy detection for each LRP band (e.g., 80 MHz frequency band) in omni-directional mode. A maximum energy detection value measurement obtained from all the 80 MHz frequency bands is noted as a HRP peak energy detection value.

Each HRP frequency band can be divided into multiple LRP frequency bands. And each LRP band is 80 MHz. The scanning of HRP channel is performed by scanning each LRP frequency band.

After completing the two scanning passes in the channel scanning procedure, the MLME function provides the channel scanning results as channel ratings to the DME function based on the scanning process. The DME function uses the channel rating results to choose a HRP channel having a minimum HRP peak energy detection value among all the scanned HRP channel, wherein said minimum HRP peak energy detection value is smaller than a HRP interference threshold. Then, the DME function selects a LRP channel with a minimal LRP peak energy detection value among the n LRP channels within the chosen HRP channel.

For example, assuming the energy detection threshold is −50 dB, and all n LRPs within one HRP are below −50 dB, then the device will scan all 80 Mhz frequency bands within the HRP. If the energy detection results for all 80 Mhz frequency bands are below −50 dB, then the scanned HRP can be chosen to start a new WiHD network.

Figure 7:
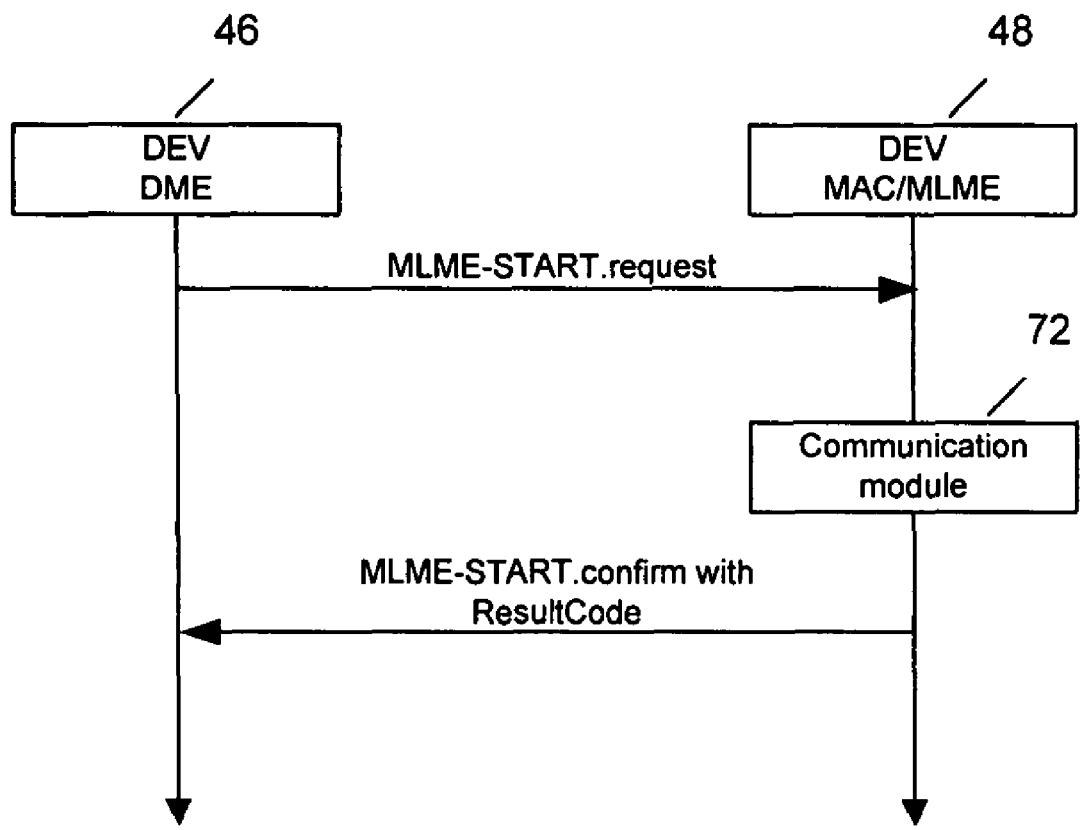
FIG. 7 illustrates an example of a message flow and WVAN start operation, according to the present invention.

Once the DME function has selected a LRP channel, a communication process of the DME function issues a MLME-START.request primitive message with the index (i.e., ChannelIndex) of the selected LRP channel. FIG. 7 illustrates an example of message flow and WVAN start operation 70 according to the present invention, wherein through the MLME-START.request message the coordinator 12 is instructed to start a WVAN on the selected LRP channel. Using a communication module 72 that implements a WVAN initialization procedure, the coordinator MLME function 48 attempts to start its own WVAN on the selected LRP channel without association with an existing WVAN. The MLME function 48 listens to the selected channel for a listening period (i.e., mMinChannelScan) to determine if the selected channel is still clear (i.e., remains available). The listening operation entails energy detection. If at the end of the listening period the MLME function determines that the selected channel is clear, the MLME function then commences communication on the channel by broadcasting a beacon via the MAC and PHY layers, once every superframe duration (FIG. 3A).

If, however, the MLME function determines that the selected channel is no longer clear, then the MLME function issues a MLME-START.confirm with a ResultCode indicating a failure to start the WVAN. In that case, the DME function can send another MLME-START.request with a different ChannelIndex to start a WVAN in a different channel, or associating as a regular DEV (i.e., the DEV will not start a new network, and instead attempts listening for a beacon associated with a coordinator that sends out the beacon periodically).

When the WVAN is successfully started, the coordinator 12 allocates an additional DEVID to itself for the purposes of exchanging data with other devices 14 (DEVs) that become members of the established WVAN. The DEVID is the unique ID for a device. Association procedure is used for a device to become a member of an established network. Once a WVAN is started in a selected Low-rate channel, the coordinator can further set up a high-rate channel and periodically allocate channel time for audio/visual (A/V) information and data transmissions using a superframe structure (FIG. 3B) according to the present invention. Channel access control is achieved using the superframe structure for both the high-rate channel and the selected low-rate channel.

When the coordinator 12 is to remove itself from the WVAN and no other devices 14 are capable of taking over as the coordinator, the coordinator announces shutdown by placing a shutdown Information Element (IE) in its broadcast beacon. The coordinator ensures that the shutdown announcement complies with the rules for beacon announcements.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for channel control in a wireless video area network, comprising:
   scanning available channels including first scanning low-rate (LR) channels by performing energy detection for each LR channel for a time period, to determine a LR peak energy detection value for each LR channel and selectively scanning high-rate (HR) channels within which all the LR channels have LR peak energy detection values smaller than a specified LR interference threshold;
   selecting a channel from the available channels with minimal interference with other networks;
   determining if the selected channel remains available for a listening period, wherein the available channels include the HR frequency channels and the LR frequency channels, such that m HR channels in a general frequency band are defined, and n LR channels are defined in the same frequency band as the HR channels, such that within each of the HR channels, a number n of LR channels are defined; and
   if the selected channel remains available, then starting communication on the selected channel.

2. The method of claim 1 wherein:
   each HR channel has a start frequency and a stop frequency which define a HR frequency band for the HR channel;
   each LR channel has a start frequency and a stop frequency which define a LR frequency band within the corresponding HR frequency band; and
   selectively scanning the HR channels further includes, for each HR channel, performing energy detection in frequency increments corresponding to the LR frequency bands within the HR channel, to determine a HR peak energy detection value for the HR channel.

3. The method of claim 2 wherein selecting a channel from the available channels further includes choosing a HR channel having a minimum HRP peak energy detection value among all the scanned HRP channels.

4. The method of claim 3 wherein said minimum HRP peak energy detection value is smaller than a HRP interference threshold.

5. The method of claim 3 wherein selecting a channel from the available channels further includes selecting a LRP channel with a minimal LRP peak energy detection value among the LRP channels within the chosen HRP channel.

6. The method of claim 1 wherein performing energy detection for a LRP channel includes performing energy detection on that channel in an omni-directional mode.

7. The method of claim 6 wherein performing energy detection in a LRP channel includes performing energy detection on that channel in different directions to emulate omni-directional energy detection.

8. The method of claim 1 further comprising the step of:
   shutting down the channel by placing a shutdown announcement in a broadcast beacon.

9. The method of claim 1 wherein communicating over the channel comprises:
   controlling channel access by dividing the channel time into superframes separated by beacons, each superframe including channel time blocks (CTBs) having one or more reserved CTBs and one or more unreserved CTBs; and communicating packets over the channel during the reserved CTBs.

10. The method of claim 1 wherein the listening period comprises duration of a superframe.

11. The method of claim 10 wherein performing energy detection for each LRP channel includes performing energy detection for a listening period longer than a superframe duration.

12. The method of claim 1 wherein the available channels include high-rate (HR) frequency channels and low-rate (LR) frequency channels, such that multiple HR channels in a general frequency band are defined, and plural LR channels are defined in the same frequency band as the HR channels.

13. The method of claim 1, wherein said general frequency band comprises 57-66 GHz and each low-rate physical (LRP) channel covers an 80 MHz band, the LRP channels are separated by 120 MHz bands, and the center frequencies of the LRP channels are separated by 200 MHz bands.

14. A coordinator for channel control in a wireless video area network, comprising:
a scanning module configured for scanning available channels, for first scanning low-rate (LR) channels by performing energy detection for each LR channel for a time period, and for determining a LR peak energy detection value for each LR channel;
a selection module configured for selecting a channel from the available channels with minimal interference with other networks; and
a communication module configured for starting communication on the selected channel if the selected channel remains available for a listening period, wherein the available channels include high-rate (HR) channels and the LR frequency channels, such that m HR channels in a general frequency band are defined, and n LR channels are defined in the same frequency band as the HR channels, such that within each of the HR channels, a number n of LR channels are defined.

15. The coordinator of claim 14 wherein the scanning module is further configured to selectively scan those HR channels within which all the LR channels have LR peak energy detection values smaller than a specified LR interference threshold.

16. The coordinator of claim 15 wherein:
each HR channel has a start frequency and a stop frequency which define a HR frequency band for the HR channel;
each LR channel has a start frequency and a stop frequency which define a LR frequency band within the corresponding HR frequency band; and
the scanning module is further configured such that, for each HR channel, the scanning module performs energy detection in frequency increments corresponding to the LR frequency bands within the HR channel, to determine a HR peak energy detection value for the HR channel.

17. The coordinator of claim 16 wherein the selection module is further configured to choose a HR channel having a minimum HR peak energy detection value among all the scanned HR channels.

18. The coordinator of claim 17 wherein said minimum HR peak energy detection value is smaller than a HR interference threshold.

19. The coordinator of claim 17 wherein the selection module is further configured to select a LR channel with a minimal LR peak energy detection value among the LR channels within the chosen HR channel.

20. The coordinator of claim 14 wherein the scanning module is further configured to perform energy detection in a LR channel in an omni-directional mode.

21. The coordinator of claim 20 wherein the scanning module is further configured to perform energy detection in a LR channel in different directions to emulate omni-directional energy detection.

22. A coordinator for channel control in a wireless video area network, comprising:
a scanning module configured for scanning available channels;
a selection module configured for selecting a channel from the available channels with minimal interference with other networks; and
a communication module configured for starting communication on the selected channel if the selected channel remains available for a listening period, wherein the available channels include high-rate (HR) channels and low-rate (LR) frequency channels, such that m HR channels in a general frequency band are defined, and n LR channels are defined in the same frequency band as the HR channels, such that within each of the HR channels, a number n of LR channels are defined, wherein the communication module is further configured to shutdown the channel by placing a shutdown announcement in a broadcast beacon.

23. A coordinator for channel control in a wireless video area network, comprising:
a scanning module configured for scanning available channels;
a selection module configured for selecting a channel from the available channels with minimal interference with other networks; and
a communication module configured for starting communication on the selected channel if the selected channel remains available for a listening period, wherein the available channels include high-rate (HR) channels and low-rate (LR) frequency channels, such that m HR channels in a general frequency band are defined, and n LR channels are defined in the same frequency band as the HR channels, such that within each of the HR channels, a number n of LR channels are defined, wherein the communication module is further configured to control channel access by dividing the channel time for the HR channel and the selected channel into superframes separated by beacons, each superframe including one or more reserved CTBs and one or more unreserved CTBs, and communicating packets over the channel during the reserved CTBs.

24. The coordinator of claim 23 wherein the listening period comprises duration of a superframe.

25. The coordinator of claim 24 wherein the scanning module is further configured to perform energy detection in a LR channel for a period longer than a superframe duration.

26. A method for channel control in a wireless network, comprising:
scanning available channels;
selecting a channel from the available channels with minimal interference with other networks; and
determining if the selected channel remains available for a listening period, wherein the available channels include a high-rate (HR) frequency channel and n low-rate (LR) frequency channels, such that n LR channels are defined in the same frequency band as the HR channel, wherein the HR channel supports uncompressed High Definition (HD) video transmission.

27. The method of claim 26, wherein n=5.

28. A high definition television (HDTV) set in a network comprising:
- a scanning module configured for scanning available channels;
- a selection module configured for selecting a channel from the available channels with minimal interference with other networks; and
- a communication module configured for starting communication on the selected channel if the selected channel remains available for a listening period, wherein the available channels include a high-rate (HR) frequency channel and n low-rate (LR) frequency channels, such that n LR channels are defined in the same frequency band as the HR channel.

29. The HDTV of claim 28, wherein n=5.

30. The HDTV of claim 28, wherein the HR channel supports uncompressed High Definition (HD) video transmission.

31. A method for channel control in a network, comprising:
- scanning available channels;
- selecting a channel from the available channels with minimal interference with other networks;
- determining if the selected channel remains available for a listening period;
- if the selected channel remains available, then starting communication on the selected channel, wherein the available channels include high-rate (HR) frequency channels and low-rate (LR) frequency channels, such that m HR channels in a general frequency band are defined, and n LR channels are defined in the same frequency band as the HR channels, such that within each of the HR channels, a number n of LR channels are defined, scanning available channels includes first scanning the LR channels by performing energy detection for each LR channel for a time period, to determine a LR peak energy detection value for each LR channel, wherein scanning available channels further includes selectively scanning those HR channels within which all the LR channels have LR peak energy detection values smaller than a specified LR interference threshold.

32. A coordinator for channel control in a wireless video area network, comprising:
- a scanning module configured for scanning available channels;
- a selection module configured for selecting a channel from the available channels with minimal interference with other networks; and
- a communication module configured for starting communication on the selected channel if the selected channel remains available for a listening period, wherein the available channels include HR frequency channels and LR frequency channels, such that m HR channels in a general frequency band are defined, and n LR channels are defined in the same frequency band as the HR channels, such that within each of the HR channels, a number n of LR channels are defined, and the scanning module is further configured for first scanning the LR channels by performing energy detection for each LR channel for a time period, for determining a LR peak energy detection value for each LR channel, and for selectively scanning those HR channels within which all the LR channels have LR peak energy detection values smaller than a specified LR interference threshold.

33. A method for channel control in a wireless video area network, comprising:
- scanning available channels;
- selecting a channel from the available channels with minimal interference with other networks;
- determining if the selected channel remains available for a listening period, wherein the available channels include high-rate (HR) frequency channels and low-rate (LR) frequency channels, such that m HR channels in a general frequency band are defined, and n LR channels are defined in the same frequency band as the HR channels, such that within each of the HR channels, a number n of LR channels are defined; and
- if the selected channel remains available, then starting communication on the selected channel, wherein communicating over the channel comprises:
  - controlling channel access by dividing the channel time into superframes separated by beacons, each superframe including channel time blocks (CTBs) having one or more reserved CTBs and one or more unreserved CTBs; and
  - communicating packets over the channel during the reserved CTBs.

\* \* \* \* \*